United States Patent [19]

Tokuda

[11] Patent Number: 5,041,995
[45] Date of Patent: Aug. 20, 1991

[54] NEGATIVE FILM INSPECTION APPARATUS

[75] Inventor: Kanji Tokuda, Kanagawa, Japan

[73] Assignee: Fuji Photo Film Co., Ltd., Kanagawa, Japan

[21] Appl. No.: 417,601

[22] Filed: Oct. 5, 1989

[30] Foreign Application Priority Data

Oct. 5, 1988 [JP] Japan ................. 63-251659

[51] Int. Cl.$^5$ .......................... G02B 1/00; G01J 3/40
[52] U.S. Cl. ........................ 364/525; 364/571.01; 356/404; 356/443; 382/41
[58] Field of Search ........... 364/525, 526, 550, 571.01; 358/75; 382/44, 42, 58, 69; 356/404, 443

[56] References Cited

U.S. PATENT DOCUMENTS 4,217,648  8/1980  Thurm et al. ................. 364/526
4,646,252 11/1990 Terashita ...................... 364/525
4,666,307  5/1987  Matsumoto ................... 364/525
4,802,107  1/1989  Yamamoto et al. .......... 364/525
4,809,198  2/1989  Terashita ...................... 364/525
4,857,960  8/1989  Hosaka et al. ............... 364/525
4,937,764  6/1990  Komatsu et al. ............. 364/525

Primary Examiner—Parshotam S. Lall
Assistant Examiner—Brian M. Mattson
Attorney, Agent, or Firm—Sughrue, Mion, Zinn, Macpeak & Seas

[57] ABSTRACT

In a negative inspection apparatus for providing exposure correction data, a data input device inputs visual inspection data of film frames, and a frame scanner provides transmitted light data for a large number of points of the frame so as to compute scanning data. Exposure correction data of a film frame is provided based on inspection data and scanning data of frame.

12 Claims, 3 Drawing Sheets

NEGATIVE FILM INSPECTION APPARATUS

BACKGROUND OF THE INVENTION

The present invention relates to a negative film inspection apparatus used together with a photographic printer in which films are exposed based on a large area transmittance density (LATD).

In a large scale photographic printing system, first an LATD is obtained by color, and then exposure is controlled based on the LATD to provide a desirable print condition. Such an LATD printing system has the advantage of providing a print having a favorable density distribution over the print when the print is made from a negative having no difference in density between a principle subject image, such as a human face, and the whole image of the negative.

Because of variations of customers' negatives, it is difficult to make prints with favorable density and color balances from almost all of the customers' negatives by the LATD printing system. As an example, in making a print from a negative including a human figure in a bright background or a human figure in a dark background (a condition generally referred to as having a density failure), or from a negative including an area having a bright color (any one of, or any combination of, red, green, blue, cyan, magenta and yellow) that is too large relative to a principle subject image, such as a human figure (a condition generally referred to as having a color failure), a principal subject image of the negative is underexposed, or with adverse effect from a color of the major part thereof, resulting in a print imbalanced in color and/or density.

To avoid such adverse effect caused by subject failures (density failure and color failure) in the LATD printing system, it has been preferred to inspect negatives prior to making prints from the negatives so as to provide proper exposures for the frames of each negative. In recent years, an improved LATD printing system in which exposure is effected with high accuracy has been developed and has become increasingly popular. The improved LATD printing system measures an original negative to detect three color densities at a large number of points of the original negative and statistically classifies the image pattern of the original negative based on the distribution of the densities. The developed LATD printing system effects an exposure obtained based on the image pattern, a characteristic value of a specific point or area and an LATD of the original negative.

However, because the conventional LATD printing systems are not equipped with an automatic exposure correcting feature for avoiding occurrences of subject failures, it is necessary to provide exposure correction data by inspecting a negative prior to making prints therefrom. Negative inspection generally is effected visually by an operator, and exposure correction value data is recorded manually in a paper tape, for example, using a so-called notcher-puncher. Such a negative inspection not only requires skill but also is quite inefficient. Accordingly, it is difficult for beginners to effect negative inspection with high accuracy and high efficiency.

SUMMARY OF THE INVENTION

It is an object of the present invention to provide a negative inspection apparatus in which even operators having no ordinary skill can effect negative inspection with high efficiency.

The above and other objects of the invention are achieved by providing, in a negative film inspection apparatus, a data input device for inputting inspection data for frames of a negative film obtained by visual inspection, a scanner having a plurality of sensors arranged side by side at regular spacings in a straight line of a film path for measuring a large number of points of the negative film, and an operation device in each sensor for providing scanning data from the measured data. A controller actuates the sensors in order so that the sensors provide the scanning data of a plurality of different frames of the negative film, respectively. Exposure correction value data for each frame are provided based on the inspection data and the scanning data of the same frame.

The sensors may be disposed to face a single frame and controlled in order so as to measure consecutive frames, respectively. Otherwise, the scanner may have a single sensor and a plurality of operation means. The sensor measures frames one after another. A selector or changing circuit connects the sensor to the operation device in order so that each operation device outputs scanning data every nth frame (where n is the number of operation units).

A recording device, such as a semi-conductor memory card and a read-write head, records the exposure correction value data for inspected negative films in the order of arrangement of frames of the negative film.

A photographic film, such as a negative film, is placed at a visual inspection stage for pre-judgment and visual observation. There, an operator inputs data of rough values necessary for density and/or color correction using correction keys and forms one notch in the film for every inspected frame. For a frame that need not be printed or should not be printed, a pass key is operated to forward the negative film without forming a notch for the frame.

After visual inspection, the film is measured by the scanners to provide scanning data. Based on the inspection data and the scanning data, eventual exposure correction value data for a frame is computed and recorded in a recording tape or a memory card, such as a paper tape, a semi-conductor memory card, or a floppy disk. Either the recording tape or the memory card, which bears the exposure correction value data, is sent to a photographic printer so as to control exposure.

Providing scanning data for one frame can be a time-consuming operation, and so the invention contemplates using a plurality of scanners, each scanner measuring every nth frame (where n is the number of scanners), so that film measurement is effected at a high speed.

DETAILED DESCRIPTION OF THE PREFERRED EMBODIMENTS

Figure 1:
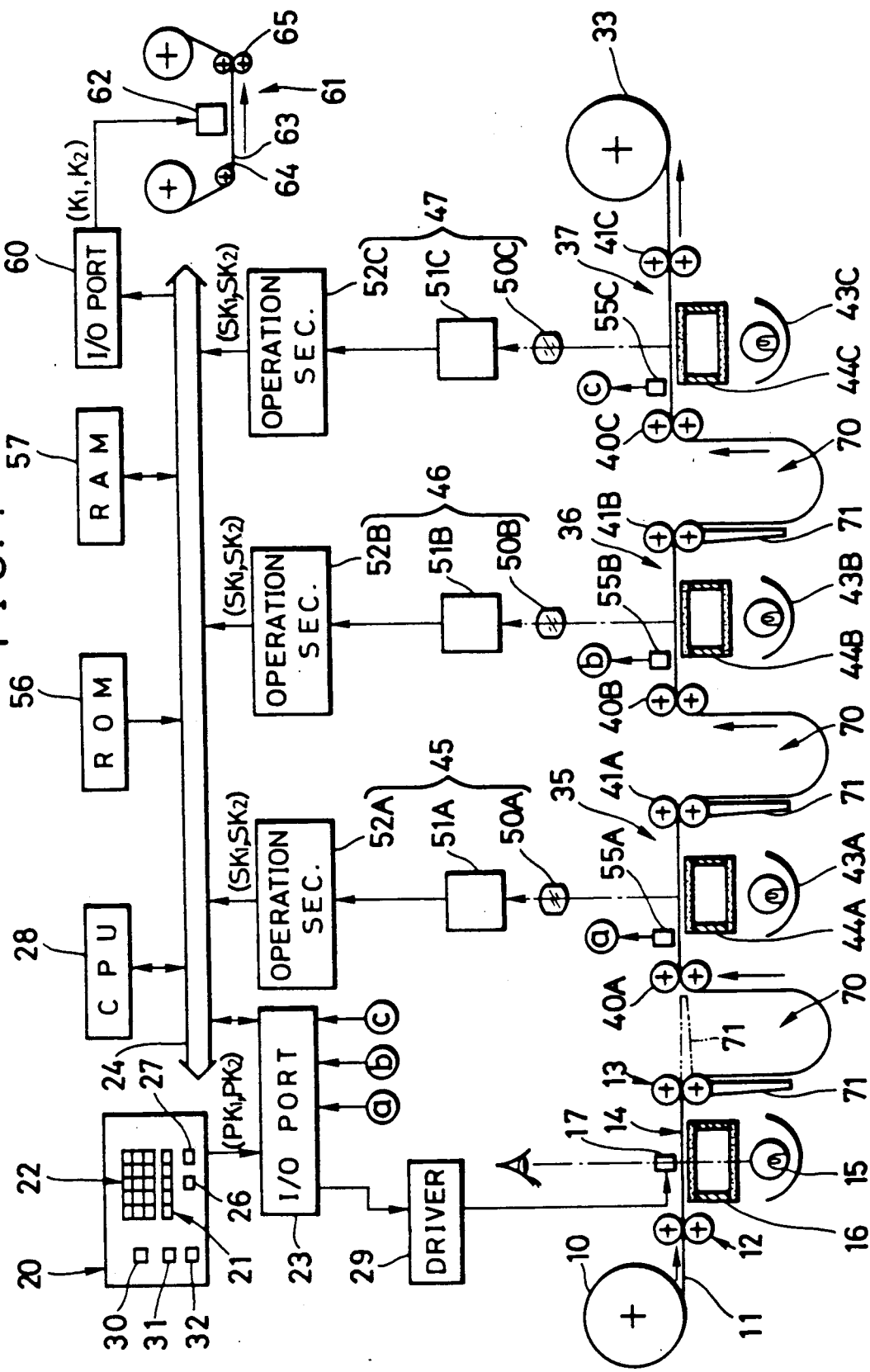
FIG. 1 is a schematic illustration showing a negative inspection apparatus in accordance with a preferred embodiment of the present invention.

Referring to the drawings wherein the same reference numerals denote the same or similar parts, FIG. 1 shows a negative inspection apparatus in accordance with a preferred embodiment of the present invention. An original film, such as a color negative film 11, is wound on a reel 10 and is withdrawn from the reel 10, one frame at a time, by drive rollers 12 and 13 and is placed at a pre-judging stage 14. Below the pre-judging stage 14, there is a white light source, such as a halogen lamp 15, and a mirror box 16. The white light from the halogen lamp 15 passes through the mirror box 16 and is diffused thereby, the diffused light illuminating the color negative film 11. The operator visually inspects the color negative film 11. A notcher 17, which is disposed beside the pre-judging stage 14, forms notches along one side margin of the color negative film 11.

Visual inspection data may represent rough correction values necessary for density and color correction, indicating the tendency of correction, such as positive correction, negative correction or no correction. The inspection data are input through density correction keys 21 and color correction keys 22 on a key pad 20 and are sent to an I/O port 23. The inspection data further are sent to a random access memory (RAM) 57 through a bus line 24 and stored therein at an address denoted by the number of notches.

The key pad 20 further is provided with a notch key 26 and a pass key 27. The notch key 26 is operated to actuate the notcher 17 by means of a driver 29 controlled by a CPU 28, thereby forming notches in the color negative film 11, after the density and color correction keys 21 and 22 are operated to input the inspection data. After the operation of any one of the notch key 26, the drive rollers 12 and 13 are driven to withdraw the color negative film 11 by one frame, so as to place another frame in the pre-judging stage 14.

The pass key 27 is operated to skip inspection for a frame at the pre-judging stage 14 so as to forward the color negative film 11 without forming a notch in the color negative film 11 for the frame.

The key pad 20 is further provided with a pre-judging mode setting key 30 and a pre-judging skipping mode setting key 31. When the pre-judging skipping key 31 is operated, the negative inspection apparatus changes to effect automatic exposure correction.

After the pre-judging stage 14, three light measuring stages 35, 36 and 37 are located side-by-side in a straight line in which the color negative film 13 travels. Each light measuring stage 35, 36, 37 is associated with drive rollers 40A and 41A, 40B and 41B, 40C and 41C, a white light source 43A, 43B, 43C, such as a halogen lamp, disposed respectively below the stage 35, 36, 37, and a mirror box 44A, 44B, 44C disposed between a respective halogen lamp 43A, 43B, 43C, and the corresponding light measuring stages 35, 36 and 37. Above each light measuring stage 35, 36, 37, there is a light scanner 45, 46, 47 consisting of an image forming lens 50A, 50B, 50C and a color image area sensor 51A, 51B, 51C. Each color image area sensor measures an image focused thereon by the image forming lens 50A, 50B, 50C in a three color dividing method. Each light scanner 45, 46, 47 is connected to a data operation unit 52A, 52B, 52C which stores outputs from the scanner 45, 46, 47 in a self-contained memory and reads them out for calculation of data of three color exposur correction values.

On one end of each light measuring stage 35, 36, 37, there is a notch sensor 55A, 55B, 55C for detecting a notch formed in the color negative film 11 beside a frame placed at the pre-judging stage 14. Each notch sensor 55A, 55B, 55C consists a light emitting element for illuminating a notch of the color negative film 11 and a light receiving element for detecting a reflected light from the notch. Notches detected by the notch sensor are counted up by the CPU 28. The CPU 28 controls various elements of the negative inspection apparatus based on data of the counted numbers of notches and a control program stored in read-only memory (ROM) 56 and various data stored in RAM 57.

The first to third scanners 45–47 are controlled by CPU 28 to operate separately based on data of the number of notches. For example, the scanner 45 measures a frame of the color negative film 11 when CPU 28 counts $(3n-2)$ notches, n being a positive integer, and stores and calculates data of the frame. Similarly, the scanners 46 and 47 measure frames of the color negative film 11 when CPU 28 counts $(3n-1)$ and $3n$ notches, respectively and store and calculate data of these frames. Each color image sensor 50A, 50B, 50C measures a large number of pixels of a frame of the color negative film 11 in a three color dividing method. Outputs of the pixels from the image area sensors 50A, 50B, 50C are stored in the self-contained memory of respective operation units 52A, 52B, 52C. The operation units, which consist of microcomputers, automatically compute outputs to provide three color data as the numbers of correction steps for the three colors and, thereafter, sends them to the bus line 24.

CPU 28 adds the data from the scanner and the data provided in pre-judging to provide an exposure correction value by color. Exposure correction value data are written in RAM 57 at an address designated by the number of notches N. In the case of the data provided in a form of a coefficient in inspecting, the CPU multiplies the data from the scanner and the coefficient.

The bus line 24 is connected to a puncher 61 through I/O port 60. The puncher 61 perforates a paper tape to form dot-pattern data therein by operating a punch key 32 of the key board 20. Upon operating the punch key 32, the CPU 28 reads out exposure correction data from RAM 57 and causes a perforator 62 to form a dot-pattern code according to the exposure correction data. Because exposure correction data read out from the paper tape is identical in form to that form the puncher 61, any printer using exposure correction data provided by the negative inspection apparatus can be used without any functional change.

Between every two adjacent stages, there is a space 70 for allowing the color negative film 11 to form an open loop therein. The provision of such an open loop of the color negative film 11 permits the data operation units 52A–52C to operate at different processing speeds. The drive rollers 40A and 40B, 41A and 41B, and 42A and 42B are driven independently from one another by pulse motors (not shown) controlled by CPU 28. Adjacent to an entrance of each light measuring stage, there is a guide plate 71 for guiding the leading end of the color negative film 11 into the stage. At the beginning of operation of the negative inspection apparatus, the guide plate 71 is driven up at an approximately right angle and, after a successful entering of the leading end into the stage, is driven down. After the final, or third light measuring stage, there is a reel 33 to wind up the color negative film 11 frame by frame after measurement. It is to be noted that, when the color negative film 11 is forwarded at a speed corresponding to the longest processing time among those of the first to third scanners 45-47, the spaces 70 are not always necessary.

In the operation of the negative inspection apparatus in accordance with the present invention, when the pre-judging mode is selected, the color negative film at the pre-judging stage 14 is visually inspected. If a frame of the color negative film 11 at the pre-judging stage 14 requires correction, the correction keys 21 and/or 22 are operated to input rough inspection data ($PK_1$, $PK_2$) necessary for correction of the frame. The rough inspection data $PK_1$, $PK_2$ are given by the numbers of steps of correction for density and color, respectively. Thereafter, the notch key 26 is operated to form a notch in the color negative film 11, and then the color negative film 11 is forwarded by one frame.

Upon forming a notch in the color negative film 11, CPU 28 increments its count value by one (1) and stores the rough inspection data ($PK_1$, $PK_2$) in RAM 57 at an address specified by the changed count value. As described previously, for a frame which need not be inspected or need not be printed, the pass key 27 is operated to place another frame of the color negative film 11 at the pre-judging stage 14. In this manner, frames of the color negative film 11 are inspected for pre-judging one after another.

The color negative film 11 is forwarded to the first light measuring stage 35, and then to the second and third light measuring stages 36 and 37 by one frame every time a frame is inspected. At each light measuring stage, the notch sensors 55A, 55B, 55C detect a notch. CPU 28 counts up notch signals from the respective notch sensors 55A-55C. When CPU 28 counts $(3n-2)$ notches, it actuates the first scanner 45 to measure the $(3n-2)$-th frame of the color negative film 11 so as to detect a measured value of each pixel of the frame in a three color dividing method. Based on an output from the scanner 45, the operation unit 52A automatically computes scanning data ($SK_1$, $SK_2$) for the frame. In the same manner as for the $(3n-2)$-th frame, the scanners 46 and 47 are driven to provide scanning data ($PK_1$, $PK_2$) for the $(3n-1)$-th and $3n$-th frames of the color negative film 11, respectively, when the $(3n-1)$-th and $3n$-th frames of the color negative film 11 are placed at the second and third stages 36 and 37.

Computation of the scanning data ($SK_1$, $SK_2$) are executed in each operation unit 52A, 52B, 52C in the following manner. Measured values of the pixels of a frame for the three colors from each scanner 45, 46, 47 are stored first in the self-contained memory of the respective operation unit 52A, 52B, 52C and processed for easy drawing of an image characteristic value of the frame. After effecting the drawing of an image characteristic value, the operation unit effects a computation of image pattern recognition based on the image characteristic value. The computation of image pattern recognition is performed based on parameters obtained from the characteristic values in various correction programs. The scanning data ($SK_1$, $SK_2$) are computed by the use of the result of image pattern recognition and a characteristic value and a LATD of a specific point or area of the frame. The scanning data $SK_1$ and $SK_2$ are given by the numbers of steps of correction for density and color, respectively.

Exposure correction value data $K_1$ and $K_2$ are calculated by the following equations in CPU 28:

$$K_1 = PK_1 + SK_1$$

$$K_2 = PK_1 + SK_2$$

Exposure correction value data ($K_1$ and $K_2$) for the three colors are stored in RAM 57 at an address specified by the number of notches N. The exposure correction data are recorded as dot-pattern codes in the paper tape 63 threaded on the puncher 61 upon operating the punch key 32 of the keyboard 22.

In printing, the paper tape 63 is threaded on a tape reader of a printer to read out and send exposure correction data $K_1$ and $K_2$ to a controller of the printer. The controller computes a proper exposure $E_i$ (wherein i indicates any one of three colors: red, green and blue) based on the exposure correction data $K_1$ and $K_2$ from the following equation:

$$\text{Log } E_i = LM_i \times CS_i \times (DN_i - D_i) + PB_i + LB_i + MB_i + NB_i + \alpha \times K_1 + \beta K_2$$

where
LM is a magnification slope coefficient which depends upon a magnification rate determined based on the sizes of the color negative film 13 and a print to be made;
CS is a color slope coefficient given for over and under exposed images inherent in the type of the color negative film 13 and selected according to the density of the frame;
DN is the standard normal density value;
D is a gain value based on a LATD value of the frame;
PB is a paper balance correcting value which depends upon the type of the color paper relative to a standard color paper;
LB is a lens balance correcting value which depends upon the type of the printing lens relative to a standard printing lens;
MB is the master balance value common to all of available color negative films;
NB is a color balancing value inherent in the color negative film 13;
$\alpha$ is the width of step of density correction key; and
$\beta$ is the width of step of color correction key.

Based on the exposure $E_i$ thus obtained by color, a frame of the color negative film 11 is exposed to make a print.

The number of scanners to be installed in the negative inspection apparatus is determined taking the capacity of pre-judgment into account. That is, expressing the capacity of pre-judging and the capacity of processing of the operation units 52A, 52B, 52C by average times $T_1$ and $T_2$, respectively, it is necessary to install as many as an operation units such that $T_1 \leq m \times T_2$, or $m \geq T_1/T_2$.

If selecting the pre-judging skipping mode, only the scanner data $SK_1$ and $SK_2$, as well as frame recognition data, are recorded in the paper tape 63. Because it is impossible to recognize frames by the numbers of notches, another sensor, such as a frame edge sensor or a perforation counter, should be installed. Otherwise, one notch for each frame may be formed automatically in the color negative film by the notcher 17 for frame recognition.

Figure 2:
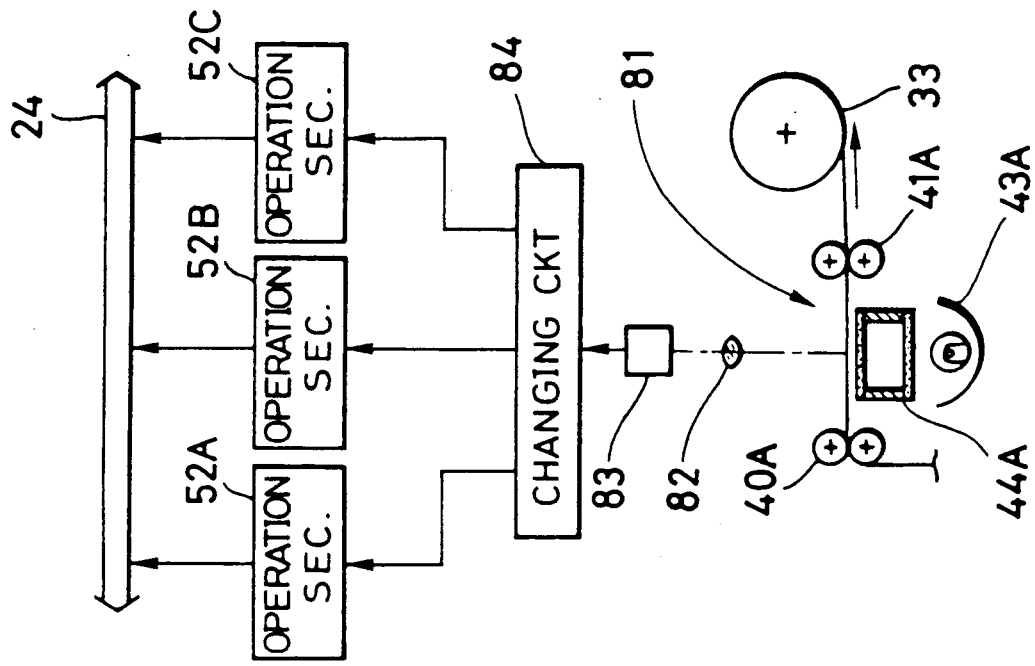
FIG. 2 is a schematic illustration showing a negative inspection apparatus in accordance with another preferred embodiment of the present invention.

Although, in the above embodiment, three light measuring stages 35-37 are provided together with three scanners 45-47, it may be possible to provide only one light measuring stage with three scanners. Thus, as shown in FIG. 2, the negative inspection apparatus in accordance with another preferred embodiment of the present invention is provided with one light measuring stage 80. Three scanners 45-47, which are installed above the stage 80 so as to aim a single frame at the stage, are driven one by one, thereby measuring three frames, respectively. In more detail, when the $(3n-2)$-th frame is placed at the stage 80, the first scanner 45 is driven to measure the frame and the operation unit 52A stores the data and computes exposure correction values. During computation by the operation unit 51A, when the $(3n-1)$-th frame is placed at the stage 80, the second scanner 51B is driven. In the same manner, each of the scanners 45-47 measures every third frame of the color negative film.

In this embodiment, because the negative scanning apparatus has only one light measuring stage and operates at the same processing speed as that in the previous embodiment, the apparatus has the advantage of a small and simple structure.

Figure 3:
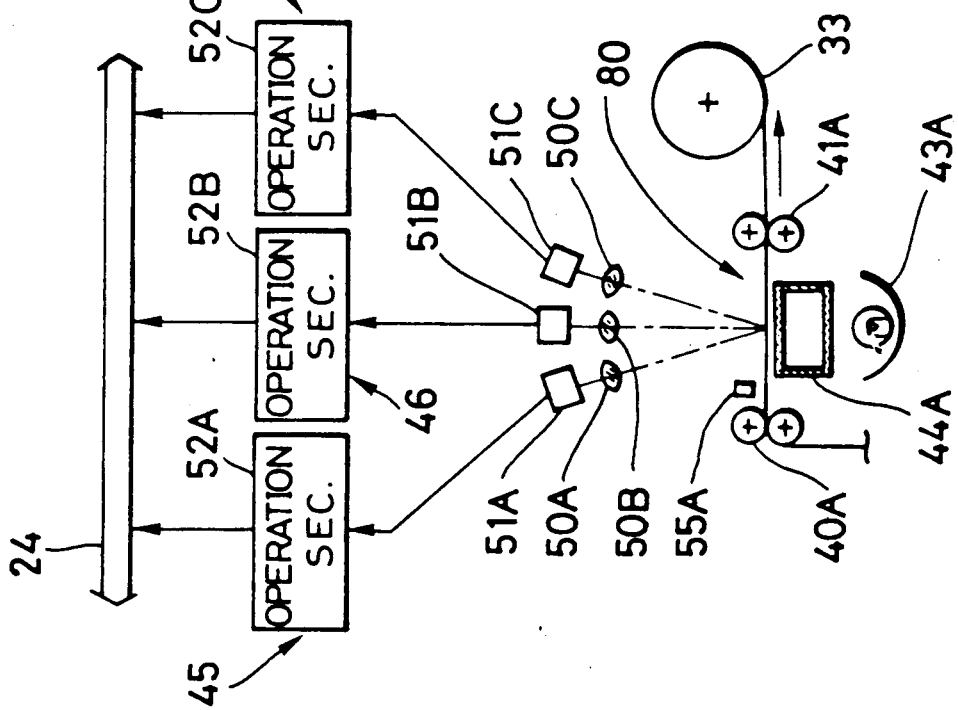
FIG. 3 is a schematic illustration showing a negative inspection apparatus in accordance with still another preferred embodiment of the present invention.

FIG. 3 shows another embodiment of the negative inspection apparatus in accordance with still another embodiment of the present invention. A single light measuring stage 81 and a single color image scanner 83 with an image forming lens 82 are provided. Outputs from the scanner 83 are separated by frame and sent in order to operation units 52A-52C, respectively, by means of the provision of one stage and one scanner, the negative inspection apparatus becomes yet simple in structure.

Figure 4:
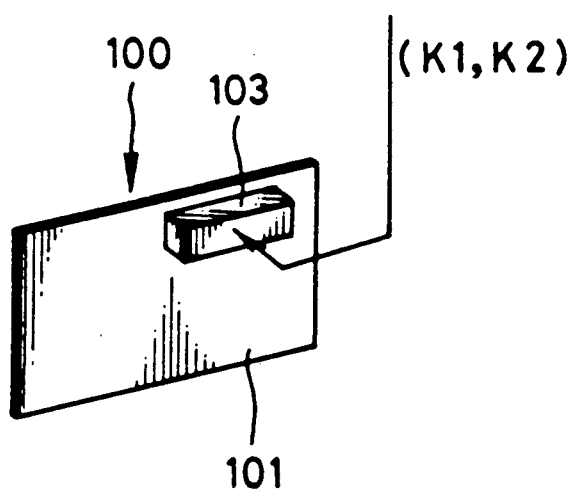
FIG. 4 is a schematic illustration showing a data recording device

In the above described embodiments, the paper tape 63 and the tape reader 61 may be replaced with a semi-conductor memory card, such as an IC card or an LSI card, and a read-write head which may take any well known form, such as that described in U.S. Pat. No. 4,827,109. As shown in FIG. 4, an LSI memory card 100 comprising various sheet coils, a power source circuit, an LSI memory, an LSI gate array and a battery, all of which are embedded in a relatively thin plastic plate 101 may be available readily. A read-write head 103 is provided with various coils corresponding to the sheet coils of the LSI card 100. By means of the write-read head 103, exposure correction data $K_1$ and $K_2$ provided in the negative inspection apparatus are written into and read out from the LSI memory of the LSI card 100. Alternatively, a floppy memory and a floppy drive may be used to record the exposure correction data $K_1$ and $K_2$.

In any embodiment, it may be permissible to output exposure correction data as values $(\alpha \times K_1 + \beta \times K_2)$ in place of the numbers of correction key steps for density and color corrections. It may also be permissible to use inspection data $(PK_1, PK_2)$ as supplemental data for correction value computation in the operation unit in place of sending the result of the inspection data and the scanning data added together in CPU 28 to the printer. Furthermore, the exposure correction value may be output in a form of coefficients to be multiplied by $(DN_i - D_i)$ in the above described equation in place of the number of steps of correction key.

Although the present invention has been fully described by way of the preferred embodiment thereof with reference to the accompanying drawings, various changes and modifications will be apparent to those of working skill in this technical field. Therefore, unless otherwise these changes and modifications depart from the scope of the present invention, they should be construed as included therein.

What is claimed is:

1. A negative inspection apparatus for providing exposure correction data, comprising:
   data input means for inputting inspection data for a plurality of frames on a film;
   a plurality of scanners arranged side by side in a straight line of passage of said film, each of said scanners comprising a sensor for measuring said film to detect transmitted light values of a plurality of points on each of said frames, and operation means for computing scanning data based on said transmitted light values;
   a controller for actuating said plurality of scanners so that said plurality of scanners compute said scanning data of said plurality of frames on said film; and
   exposure correction data providing means for supplying said exposure correction data for each of said frames on said film based on said inspection data and said scanning data of each of said frames.

2. The negative inspection apparatus as defined in claim 1, wherein said exposure correction data providing means includes recording means for recording said exposure correction data in an order of arrangement of said frames on said film.

3. The negative inspection apparatus as defined in claim 2, wherein and recording means comprises a semi-conductor recording card and a recording head.

4. The negative inspection apparatus as defined in claim 3, wherein said semi-conductor recording card comprises an LSI card.

5. A negative inspection apparatus for providing exposure correction data, comprising:
   data input means for inputting inspection data for a plurality of frames on a film;
   a plurality of scanners disposed facing a measuring position, each of said scanners comprising a sensor for measuring said film to detect transmitted light values of a plurality of points on each of said frames, and operation means for computing scanning data based on said transmitted light values;
   a controller for selectively actuating said plurality of scanners one after another so that said plurality of scanners compute said scanning data of said plurality of frames on said film; and
   exposure correction data providing means for supplying said exposure correction data for each of said frames on said film based on said inspection data na said scanning data of said frame.

6. The negative inspection apparatus as defined in claim 5, wherein said exposure correction data providing means includes recording means for recording said exposure correction data in an order of arrangement of said frames on said film.

7. The negative inspection apparatus as defined in claim 6, wherein said recording means comprises a semi-conductor recording card and a recording head.

8. The negative inspection apparatus as defined in claim 7, wherein said semi-conductor recording card comprises an LSI card.

9. The negative inspection apparatus for providing exposure correction data, comprising:
   data input means for inputting inspection data for a plurality of frames on a film;

a sensor for measuring said film to detect transmitted light values of a plurality of points on each of said frames and providing said transmitted light values as an output;

a plurality of operation means for computing scanning data based on said transmitted light values of said plurality of points on each of said frames;

selecting means for selectively connecting said output from said sensor for said frames to said plurality of operation means; and exposure correction data providing means for supplying said exposure correction data for each of said frames on said film based on said inspection data nd said scanning data of each of said frames.

10. The negative inspection apparatus as defined in claim 9, wherein said exposure correction data providing means includes recording means for recording said exposure correction data in an order of arrangement of said frames on said film.

11. The negative inspection apparatus as defined in claim 10, wherein said recording means comprises a semi-conductor recording card and a recording head.

12. The negative inspection apparatus as defined in claim 11, wherein said semi-conductor recording card is an LSI card.

* * * * *